United States Patent
Gill et al.

(10) Patent No.: US 8,223,462 B2
(45) Date of Patent: Jul. 17, 2012

(54) MAGNETORESISTIVE SENSOR DESIGN FOR SIGNAL NOISE PICKUP REDUCTION FOR USE WITH DEEP GAP ELECTROSTATIC DISCHARGE SHUNT

(75) Inventors: Hardayal Singh Gill, Palo Alto, CA (US); Wen-Chien David Hsiao, San Jose, CA (US); David John Seagle, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1083 days.

(21) Appl. No.: 12/129,991

(22) Filed: May 30, 2008

(65) Prior Publication Data

US 2009/0296284 A1 Dec. 3, 2009

(51) Int. Cl.
*G11B 5/33* (2006.01)
(52) U.S. Cl. ....................................................... 360/319
(58) Field of Classification Search ............... 360/235.4, 360/313, 319, 323; 29/603.12
See application file for complete search history.

(56) References Cited

U.S. PATENT DOCUMENTS

| | | | |
|---|---|---|---|
| 5,375,022 A | 12/1994 | Gill et al. | 360/113 |
| 5,491,605 A | 2/1996 | Hughbanks et al. | 360/113 |
| 5,761,009 A | 6/1998 | Hughbanks et al. | 360/113 |
| 5,805,390 A | 9/1998 | Takeura | 360/113 |
| 6,267,903 B1 * | 7/2001 | Watanuki | 216/22 |
| 6,288,880 B1 | 9/2001 | Hughbanks et al. | 360/323 |
| 6,404,604 B2 | 6/2002 | Odai et al. | 360/320 |
| 6,415,500 B1 | 7/2002 | Han et al. | 29/603.14 |
| 6,427,319 B1 | 8/2002 | Cook et al. | 29/603.12 |
| 6,470,566 B2 | 10/2002 | Hsiao et al. | 29/603.13 |
| 6,643,106 B2 * | 11/2003 | Bougtaghou et al. | 360/323 |
| 6,650,511 B2 * | 11/2003 | Hsiao et al. | 360/323 |
| 7,199,982 B2 | 4/2007 | Suk | 360/294.7 |
| 7,256,970 B2 | 8/2007 | Shen et al. | 360/322 |
| 2003/0220050 A1 * | 11/2003 | Bunch et al. | 451/5 |
| 2004/0017640 A1 | 1/2004 | Hughbanks et al. | 360/323 |
| 2004/0090715 A1 * | 5/2004 | Hsiao et al. | 360/323 |
| 2006/0061913 A1 | 3/2006 | Sekiguchi et al. | 360/323 |
| 2007/0076328 A1 | 4/2007 | Jayasekara et al. | 360/323 |
| 2007/0097557 A1 | 5/2007 | Seagle | 360/323 |
| 2007/0133130 A1 | 6/2007 | Biskeborn | 360/323 |

* cited by examiner

*Primary Examiner* — Angel A. Castro
(74) *Attorney, Agent, or Firm* — Zilka-Kotab, PC

(57) ABSTRACT

A magnetic head having an electrostatic shunt structure for preventing damage to the magnetic head during manufacture. A portion of the shunt structure is removed during manufacture, however another portion remains. In order to prevent the remaining portions of the shunt structure from picking up stray magnetic and electromagnetic fields, an electromagnetic shield, is provided between the remaining portions of the shunt structure and the substrate.

13 Claims, 8 Drawing Sheets

MAGNETORESISTIVE SENSOR DESIGN FOR SIGNAL NOISE PICKUP REDUCTION FOR USE WITH DEEP GAP ELECTROSTATIC DISCHARGE SHUNT

FIELD OF THE INVENTION

The present invention relates to magnetoresistive sensors and more particularly to an electrostatic discharge shunt structure for preventing damage to the sensor during manufacture, and to a shield structure for preventing signal noise pickup resulting from remnant portions of the shunt structure remaining after manufacture.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos $\Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

SUMMARY OF THE INVENTION

The present invention provides a magnetic head having an electrostatic shunt structure for preventing damage to the magnetic head during manufacture. A portion of the shunt structure is removed during manufacture, however another portion remains. In order to prevent the remaining portions of the shunt structure from picking up stray magnetic and electromagnetic fields, an electromagnetic shield, is provided between the remaining portions of the shunt structure and the substrate.

The shunt structure can be a deep gap shunt structure, wherein portions of the shunt structure are formed during the manufacture of the magnetic head and of the same materials as the materials making up the magnetic head. For example, the magnetic head can include a sensor stack sandwiched between first and second shield layers, and the electrostatic shunt structure can include lead layers formed of the same material and in the same plane as the shield layers. The shunt structure can also include a shunt layer sandwiched between the first and lead layers and formed of the same material as, and in the same plane as, the sensor stack.

The electromagnetic shield layer can be constructed of a thin layer of electrically conductive, magnetic material such as NiFe, and is preferably recessed from the air bearing surface in order to prevent stray field erasure from flux concentrations in the electromagnetic shield.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
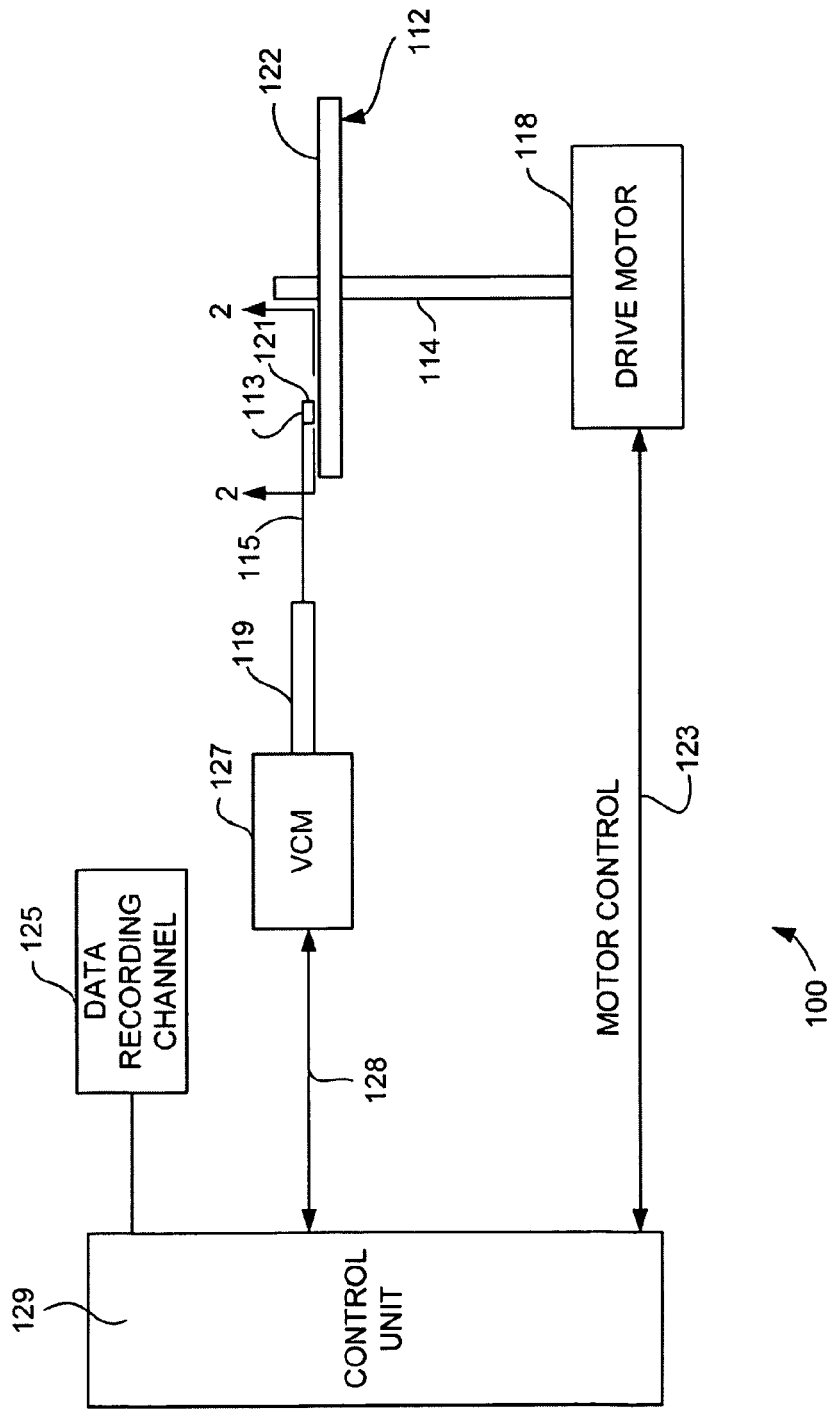
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
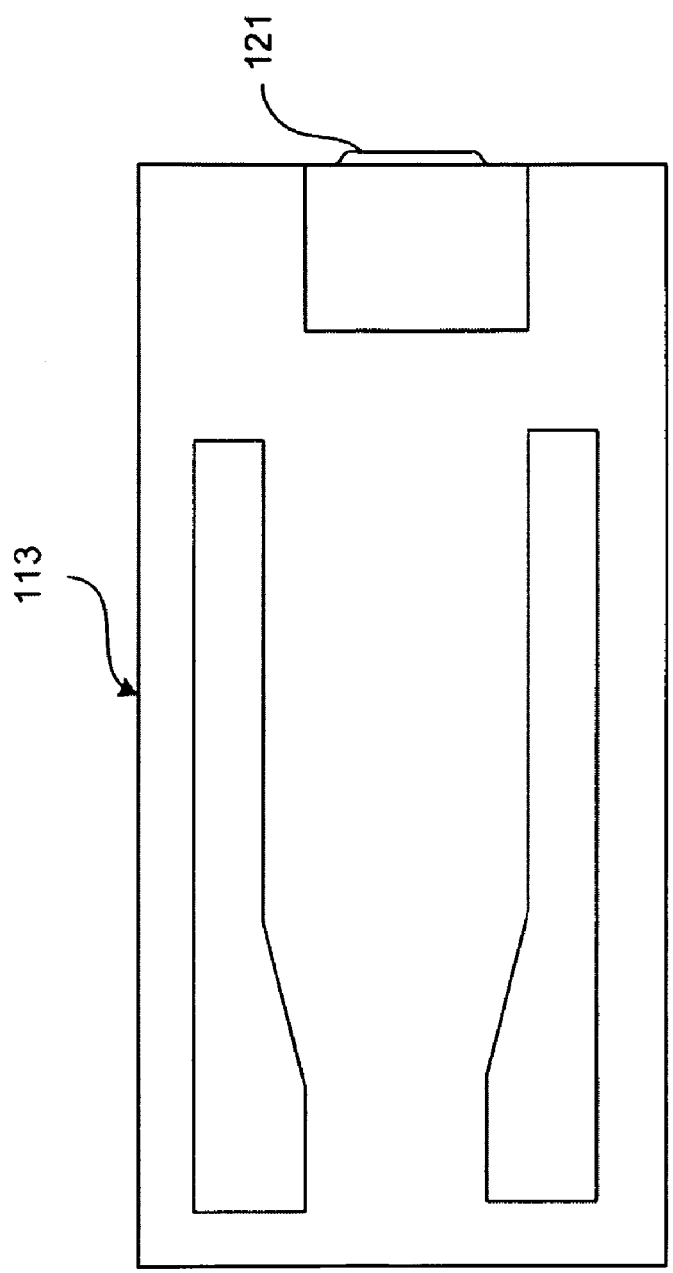
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
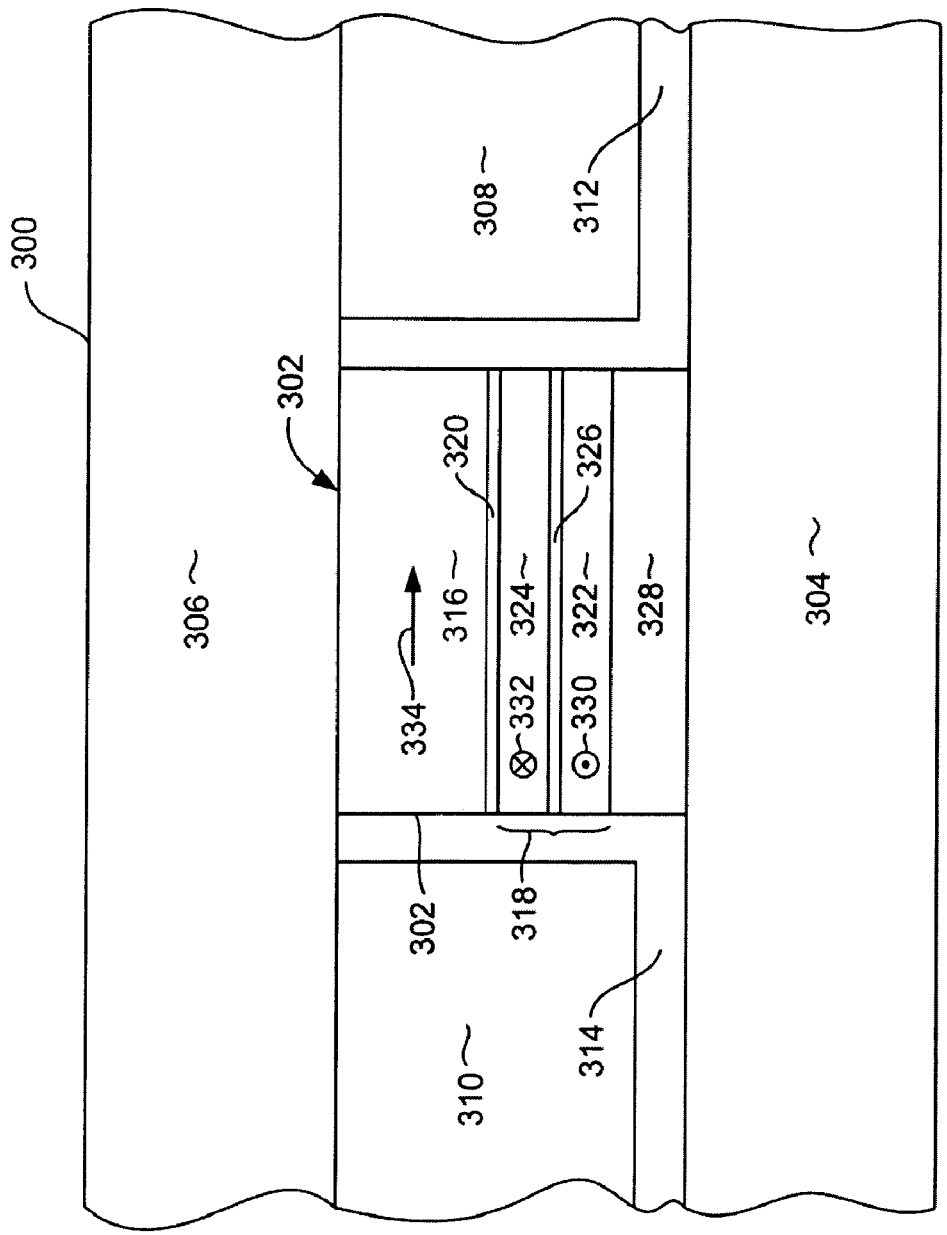
FIG. 3 is an enlarged ABS view of a magnetoresistive sensor of a magnetic head for use in disk drive system.

With reference now to FIG. 3, a magnetic read head 302 is shown as viewed from the air bearing surface (ABS). The read head 300 includes a magnetoresistive sensor stack 302 that is sandwiched between first and second electrically conductive lead/shield layers 304, 306. The lead/shield layers 304, 306 can be constructed of a magnetic material such as NiFe or CoFe so that they can function as magnetic shields as well as electrically conductive leads.

The sensor stack 302 includes a magnetic free layer structure 316 and a magnetic pinned layer structure 318. A non-magnetic layer 320 is sandwiched between the free layer 316 and pinned layer structure 318. It should be pointed out at this point that the invention can be embodied in a current perpendicular to plane giant magnetoresistive sensor (CPP GMR) or in a tunnel junction magnetoresistive sensor (TMR). If the read head 300 is a CPP GMR, then the non-magnetic layer 320 is an electrically conductive, non-magnetic spacer layer constructed of a material such as Cu or an oxide of Cu. On the other hand, if the read head 300 is a TMR sensor, then the non-magnetic layer 320 will be a thin, non-magnetic, electrically insulating barrier layer, constructed of a material such as MgO or AlO.

The pinned layer structure 318 includes a magnetically pinned layer 322 (AP1) and a reference layer 324 (AP2). The layers 322 and 324 are antiferromagnetically coupled across a non-magnetic antiparallel coupling layer 326. The pinned layer 322 can be exchange coupled with a layer of antiferromagnetic material (AFM) 328 such as IrMn or PtMn which strongly pins the magnetization of the pinned layer 322 in a first direction perpendicular to the ABS as indicated by arrowhead symbol 330. The antiparallel coupling between the layers 322, 324, then strongly pins the magnetization of the reference layer 324 as indicated by arrow tail symbol 332.

First and second hard bias layers 308, 310 can be provided at either side of the sensor stack 302. The hard bias layers 308, 310 can be constructed of a hard magnetic material such as CoPt or CoPtCr, and provide a magnetic bias field that biases a magnetization of a magnetic free layer 316 in a direction parallel with the ABS as indicated by arrow symbol 334. The hard bias layers 308, 310 are separated from the sensor stack 302 and at least one of the lead/shield layers 304 by non-magnetic, electrically insulating layers 312, 314, which can be, for example, alumina.

During manufacture of the read head 300, the sensor 302 is susceptible to damage from electrostatic discharge (ESD). An electrostatic discharge event can send a short but high burst of current through the sensor stack 302 across the shield/leads 304, 306, which can completely destroy the sensor 300. One way to prevent such ESD damage is to provide an electrical shunt between the lead/shields 304, 306 during manufacture of the sensor. An example of a very effective shunt for preventing ESD related damage to the sensor 300 is a deep gap shunt structure which is discussed in depth in U.S. patent application, Publication Number U.S. 2007/0097557 A1, application Ser. No. 11/612,539 entitled SYSTEM, METHOD, AND APPARATUS FOR PROVIDING A TEMPORARY, DEEP SHUNT ON WAFER STRUCTURES FOR ELECTROSTATIC DISCHARGE PROTECTION DURING PROCESSING, which is incorporated herein by reference as if fully set forth herein.

Figure 4:
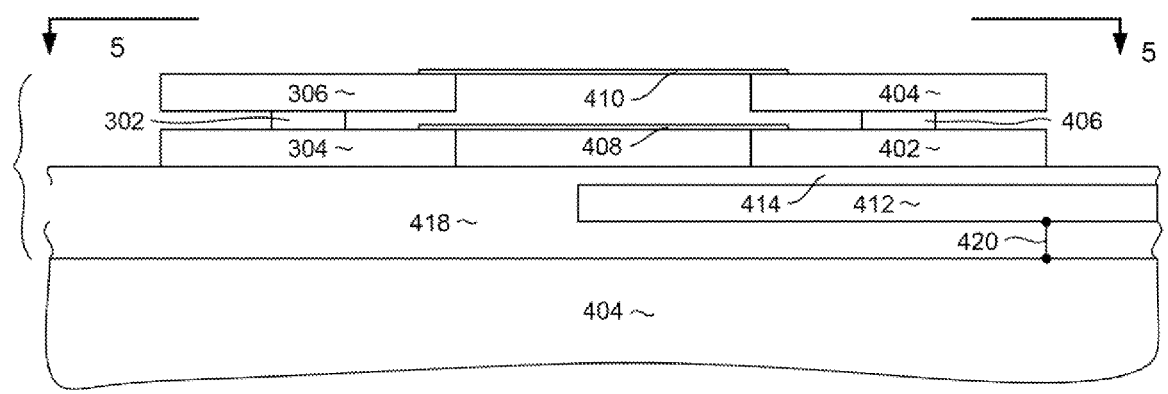
FIG. 4 is an enlarged view of a read head and deep gap ESD shunt as viewed along a plane that is parallel with the air bearing surface.

With reference now to FIG. 4, a head structure 402 is formed on a substrate 404, which can be a wafer, such as Ti—O or some other material. The sensor stack 302 is sandwiched between the first and second shield/lead layers 304, 306 as mentioned above with reference to FIG. 3. In addition, first and second layers of shield/lead material 402, 404 are formed in an area laterally outside region of the sensor 302. The layers 402, 404 can be formed in the same deposition and patterning steps used to form the shield/leads 302, 304, a can also be formed of the same material as the shield/leads 304, 306. In addition, a deep gap shunt structure 406 is sandwiched between the shield/lead material layers 402, 404. The shunt structure can be formed of the same materials that make up the sensor stack 302, and can be formed in the same photolithographic patterning and deposition steps used to form the sensor stack 302. First and second shunt lead layers 408, 410, constructed of an electrically conductive material such as Cu, electrically connects the lead/shield layers 304, 306 with the shunt shield/lead layers 402, 404.

Figure 5:
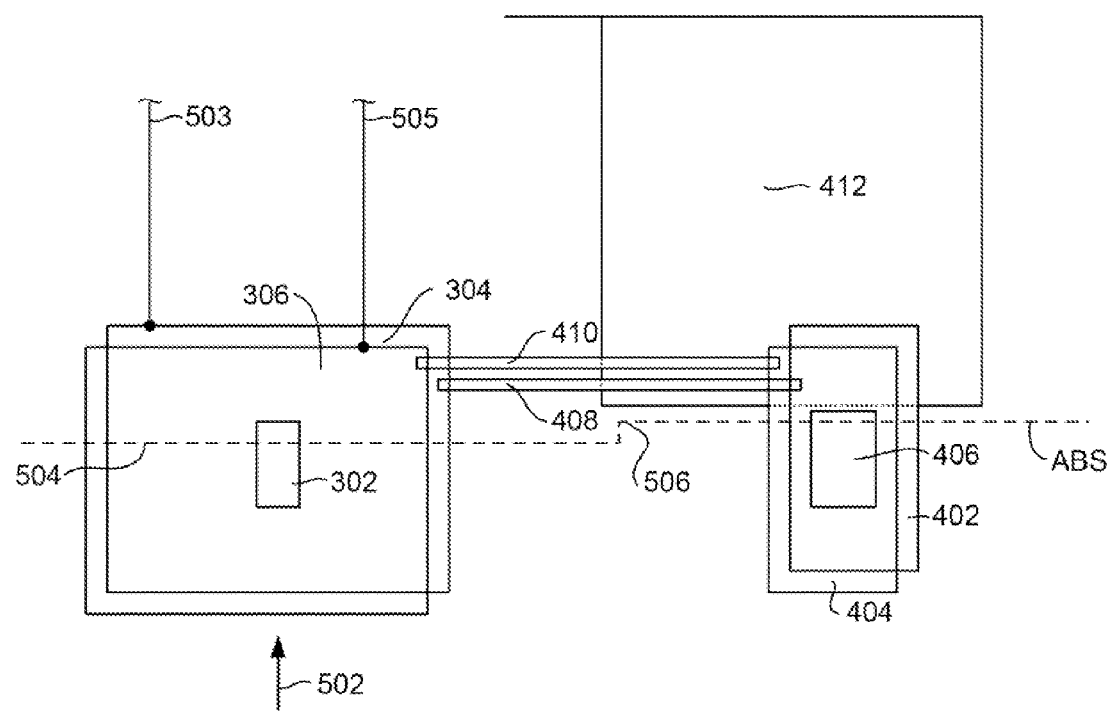
FIG. 5 is a top down view of the read head and deep gap ESD shunt as viewed from line 5-5 of FIG. 4.

FIG. 5, shows a top down view of the head and shunt structure described above. The shield lead layers 304, 306 and shunt lead/shield layers 402, 404 are shown offset from one another so that both the upper shield layers 306, 404 and lower shield layers 304, 402 can be seen. Leads 503, 505 can connect the shield/leads 304, 306 with arm electronics (not shown). The location of a future air bearing surface is indicated by dashed line denoted ABS. As those skilled in the art will appreciate, a magnetic head is constructed on a wafer, which is later sliced into rows of heads and lapped to form the air bearing surface, and is then cut into individual sliders.

Although the shunt structure 406 is formed of the same material as and in the same steps as the sensor stack 302, it preferably covers a larger area as seen in FIG. 5. This decreases the electrical resistance of the shunt structure 406 readily allowing electrical current to be shunted between the structures 402, 406 across the shunt structure 406.

During manufacture of the sensor stack 302 and leads 304, the shunt structure 402, 404, 406 protects the sensor stack 302 from being damaged by electrostatic discharge, by ensuring that no ESD induced current flows through the sensor stack 302. In addition, a write head (not shown) can be formed over the read head (302, 304, 306). The shunt structure 402, 404, 406 also protects the sensor stack 302 during manufacture of the write head (not shown). After forming the read and write heads, a lapping operation is performed to remove material from the direction indicated by arrow 502 to define the air bearing surface (ABS). The lapping operation can be terminated when the un-recessed portion 504 of the ABS has been reached, thereby defining the ABS of the sensor itself.

Figure 8:
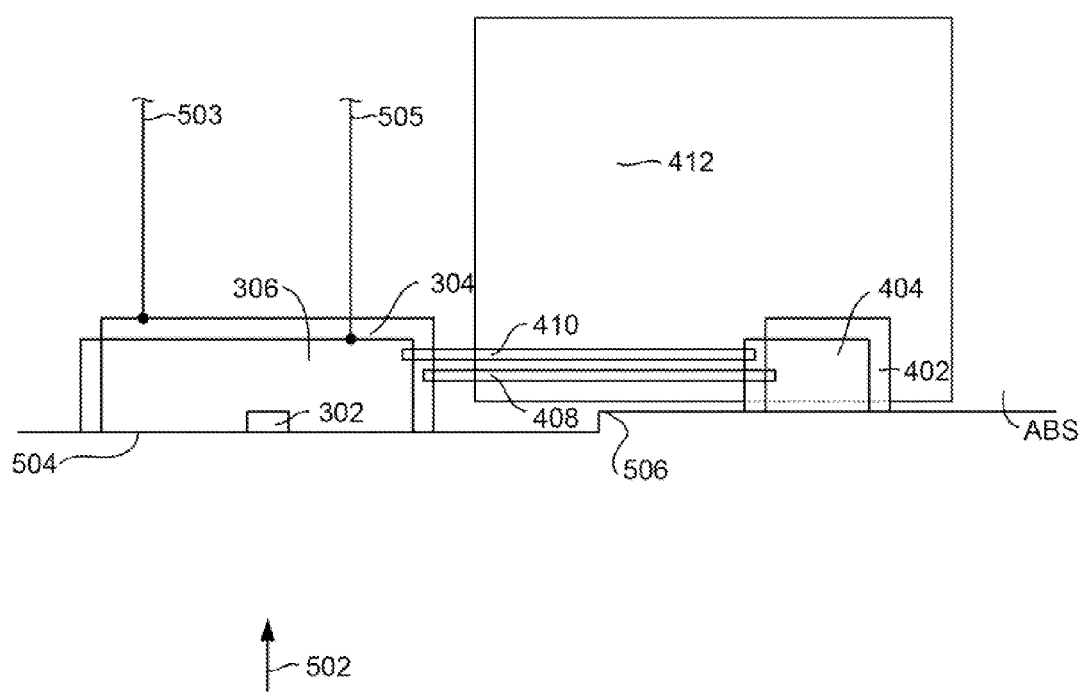
FIG. 8 is a top down view of a read head and deep gap ESD shunt similar to that of FIG. 5, shown after the ABS has been formed and a portion of the ELD shunt structure has been removed.

Then, a mask structure, such as a photoresist mask, can be formed on the ABS to cover the region of the sensor, 302 and shield/leads 304, 306, leaving the region around the shunt structure 402, 404, 406 uncovered. A reactive ion etching (RIE) or ion milling operation can then be performed to remove material from the ABS, thereby forming a recess 506. This recess is formed sufficiently that the shunt layer 406 is completely removed. This results in a structure such as shown in FIG. 8, with the shunt structure 406 (FIG. 5) removed. The shield 412 is preferably recessed from the ABS as shown in FIG. 8, although this is not absolutely necessary. As can be seen, then, the shunt structure 406 provides ESD protection even during the entirety of the lapping process, before being removed by RIE or ion milling.

After formation of the finished head, remnants of the shunt structure remain. For example, the shunt shield/lead layers 402, 404 and also the lead layers 408, 410 act as antennas to pick up stray electromagnetic fields. These fields can be from the media, from external sources, from the disk drive system or from the head itself. These electromagnetic fields, when picked up by the shield and lead layers 402, 404, 410, 408, cause unwanted signal noise in the read sensor 302. In fact the noise picked up by these remnant layers 402, 404, 410, 408, can make the sensor 302 completely unusable.

In order to prevent such signal interference, the invention includes an electromagnetic shield 412. The shield 412 is separated from the read head 300 and shunt structures 402-410 by a non-magnetic, electrically insulating material such as alumina 414. The shield 412 can be disposed between the read head 300 and the slider substrate 404, and is preferably electrically connected with the slider substrate 404 (i.e. electrically connected with the wafer substrate). This electrical connection with the substrate 404 can be achieved by forming the shield directly in contact with the substrate. Alternatively, an insulating layer 418 can be provided between the shield 412 and substrate 404 and electrical contact between the substrate 404 and shield 412 can be provided by an electrical connection 420 such as an electrically conductive stud deposited into a via formed in the insulation layer 418.

The shield 412 need not be very thick, and can be, for example, 10 to 100 nm thick and can be constructed of an electrically conductive, magnetic material such as NiFe. Because the shield is very thin, data erasure due to stray magnetic field pickup in the shield is not likely. However, to further prevent stray field data erasure from magnetic field emitting from the shield 412, the shield 412 is preferably recessed from the air bearing surface (ABS) as shown in FIG. 5.

The shield 412 absorbs any stray electromagnetic field, preventing such fields from being picked up by the shunt structures 402-410. This very effectively prevents stray fields from causing signal interference in the read head 300. The electrical connection 420 between the shield 412 and the substrate 404 keeps the shield grounded, greatly increasing the efficiency of the shield by shunting any stray fields to the substrate, away from the head 300. The shield 412 can be constructed of various electrically conductive materials, but is preferably constructed of a magnetic, electrically conductive material such as NiFe.

The above descriptions have discussed the use of a deep gap shunt structure and shield for use with a current perpendicular to plane (CPP) read head 300. The invention can, however, also be adapted for use with a current in plane (CIP) read head, wherein current flows through a sensor stack in a plane that is essentially parallel with the plane of the layers making up the sensor stack.

Figure 6:
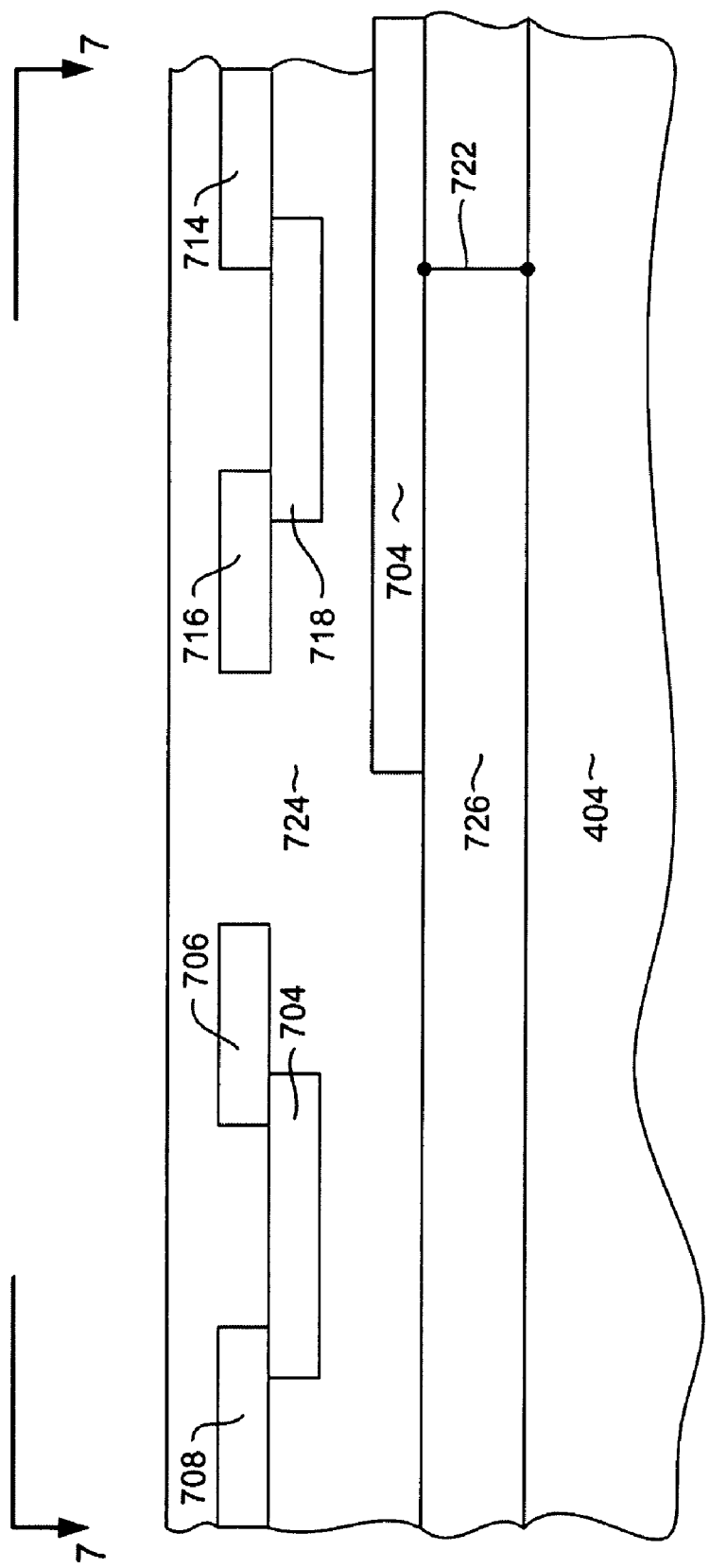
FIG. 6 is an enlarged view of a read head and deep gap ESD shunt according to another embodiment of the invention, as viewed along a plane that is parallel with the air bearing surface.
Figure 7:
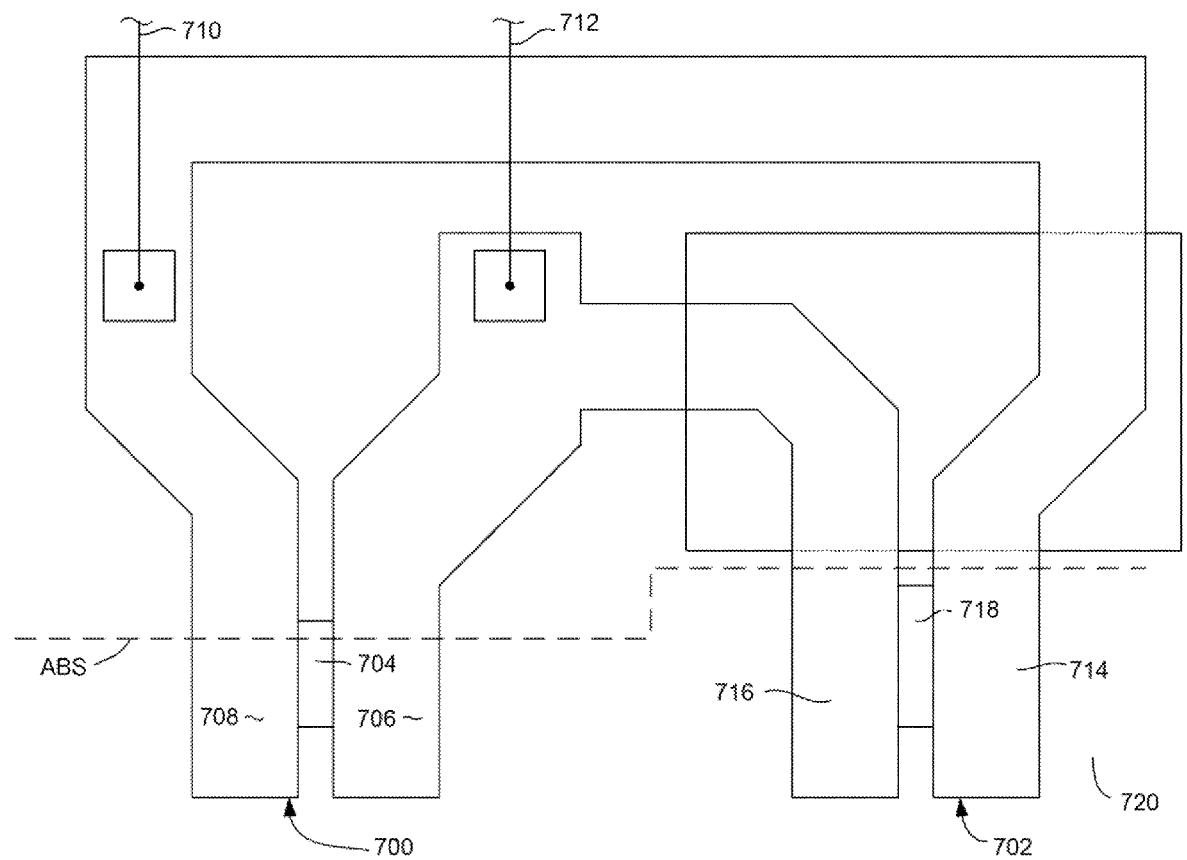
FIG. 7 is a top down view of the read head and deep gap ESD shunt as viewed from line 7-7 of FIG. 6.

With reference now to FIGS. 6 and 7, a configuration is described for use with a current in plane (CIP) sensor. An embodiment of the invention includes a read head 700 and a shunt structure 702. The read head includes a sensor stack 704 located between first and second leads 706, 708, which are located at either side of the sensor stack 704 rather than above and below the sensor stack 704. The leads 706, 708 can be connected with arm electronics leads 710, 712. The leads 706, 708 also connect extend to an adjacent location to provide shunt leads 714, 716 at a shunt location laterally away from the read head 700. The lead layers 714, 716 and 706, 708 can be constructed of an electrically conductive, non-magnetic material such as Rh, Cu or Au.

The shunt region 702 includes a sacrificial shunt structure 718 formed between the lead layers 714, 716. The sacrificial shunt structure 718 can be formed of the same material as and in the same deposition steps as the sensor stack 704, but having a larger stripe height for reduced electrical resistance.

As with previously described embodiment, a shield 720 is provided beneath the shunt area 702, and read head are 700. With reference to FIG. 6, the shield 720 can be electrically connected with the substrate 404, either by an electrical connection 722 (FIG. 6) or by direct contact between the shield 720 and substrate 404. The shield can be separated from the shunt structure 702 by an insulation layer 724 such as alumina. The shield 720 can also be separated from the substrate by an insulation layer 726 (FIG. 6).

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic head, comprising:
a substrate;
a magnetoresisitive sensor stack sandwiched between first and second sensor shield layers;
a shunt layer sandwiched between first and second magnetic, electrically lead/shield layers, the shunt layer and first and second shunt lead/shield layers being located in a region laterally removed from the sensor stack and the first and second magnetic, electrically conductive sensor shield/lead layers;
first and second leads electrically connecting the first sensor lead/shield layer with the first shunt shield/lead layer, and a second lead electrically connecting the second sensor lead/shield layer with the second shunt shield/lead layer; and
an electromagnetic shield layer disposed between the substrate and the first and second shunt lead/shield layers and the shunt layer.

2. A magnetic head as in claim 1 wherein the first sensor lead/shield layer is formed in the same plane as the first shunt lead/shield layer, the shunt layer is formed in the same plane as the sensor stack, and the second sensor lead/shield layer is formed in the same plane as the second shunt lead/shield layer.

3. A magnetic head as in claim 1 wherein the first and second sensor lead/shield layers and the first and second shunt lead/shield layers are formed of the same magnetic, electrically conductive material.

4. A magnetic head as in claim 1 wherein the first and second sensor lead/shield layers and the first and second shunt lead/shield layers are formed of NiFe.

5. A magnetic head as in claim 1 wherein the sensor stack and shunt layer are formed in the same plane and formed of the same materials.

6. A magnetic head as in claim 1 wherein the electromagnetic shield layer is electrically connected with the substrate.

7. A magnetic head, comprising:
a substrate;
a sensor stack located in a sensor region between first and second magnetic shield layers;
first and second shunt lead layers formed in a region laterally removed from the sensor region, the first shunt lead layer being formed in a common plane with and of the same material as the first shield layer, the second shunt lead being formed in a common plane with and of the same material as the second shield layer; and
an electromagnetic shield disposed between the substrate and the first and second shunt leads.

8. A magnetic head as in claim 7 wherein the electromagnetic shield comprises an electrically conductive, magnetic material.

9. A magnetic head as in claim 7 wherein the electromagnetic shield comprises NiFe.

10. A magnetic head as in claim 7 wherein the first and second shunt leads are electrically connected with the first and second shield layers.

11. A magnetic head as in claim 7 wherein the first and second lead layers are remnants of an electrostatic discharge shunt structure, a portion of which has been removed during manufacture of the magnetic head.

12. A magnetic head as in claim 7 wherein the electromagnetic shield layer is electrically connected with the substrate.

13. A magnetic head as in claim 7 further comprising an air bearing surface, and wherein the electromagnetic shield layer is recessed from the air bearing surface.

* * * * *